(12) United States Patent
Shimazawa et al.

(10) Patent No.: US 8,248,895 B2
(45) Date of Patent: Aug. 21, 2012

(54) METHOD FOR MANUFACTURING THERMALLY-ASSISTED MAGNETIC RECORDING HEAD COMPRISING LIGHT SOURCE UNIT AND SLIDER

(75) Inventors: Koji Shimazawa, Tokyo (JP); Yoshihiro Tsuchiya, Tokyo (JP); Seiichi Takayama, Tokyo (JP); Nobuyuki Mori, Tokyo (JP); Yasuhiro Ito, Tokyo (JP); Kosuke Tanaka, Tokyo (JP); Osamu Shindo, Tokyo (JP); Ryuji Fujii, Shatin (CN); Takashi Honda, Shatin (CN); Yoshitaka Sasaki, Milpitas, CA (US)

(73) Assignees: TDK Corporation, Tokyo (JP); Headway Technologies, Inc., Milpitas, CA (US)

( * ) Notice: Subject to any disclaimer, the term of this patent is extended or adjusted under 35 U.S.C. 154(b) by 293 days.

(21) Appl. No.: 12/726,981

(22) Filed: Mar. 18, 2010

(65) Prior Publication Data

US 2011/0228649 A1   Sep. 22, 2011

(51) Int. Cl.
*G11B 11/00* (2006.01)
(52) U.S. Cl. .............................. 369/13.33; 369/112.27
(58) Field of Classification Search ............... 369/13.33, 369/13.32, 13.24, 13.14, 13.03, 13.02, 13.12, 369/112.27, 112.09, 112.14; 360/59, 313, 360/245.3, 126, 125.31, 125.74
See application file for complete search history.

(56) References Cited

U.S. PATENT DOCUMENTS

| 5,481,082 | A | 1/1996 | Yamamoto |
| 7,538,978 | B2 | 5/2009 | Sato et al. |
| 7,804,655 | B2 | 9/2010 | Shimazawa et al. |
| 2005/0213436 | A1 | 9/2005 | Ono et al. |
| 2008/0043360 | A1 | 2/2008 | Shimazawa et al. |
| 2008/0056073 | A1 | 3/2008 | Shimizu |
| 2009/0052078 | A1 | 2/2009 | Tanaka et al. |
| 2011/0228650 | A1* | 9/2011 | Shimazawa et al. ....... 369/13.24 |
| 2011/0242697 | A1 | 10/2011 | Mori et al. |

FOREIGN PATENT DOCUMENTS

JP    A-2009-301597    12/2009

OTHER PUBLICATIONS

Oct. 17, 2011 Office Action issued in U.S. Appl. No. 12/728,510.
Rottmayer et al., "Heat-Assisted Magnetic Recording," *IEEE Transactions on Magnetics*, vol. 42, No. 10, pp. 2417-2471, Oct. 2006.
U.S. Appl. No. 12/628,761, filed Dec. 1, 2009 in the name of Shimazawa et al.
U.S. Appl. No. 12/728,510, filed Mar. 22, 2010 in the name of Shimazawa et al.

* cited by examiner

*Primary Examiner* — Ali Neyzari
(74) *Attorney, Agent, or Firm* — Oliff & Berridge, PLC

(57) ABSTRACT

A method for manufacturing a thermally-assisted magnetic recording head is provided, in which a light source unit including a light source and a slider including an optical system are bonded. A unit substrate is made of a material transmitting light having a predetermined wavelength, and an adhesion material layer is formed on the light source unit and/or the slider. The manufacturing method includes: aligning the light source unit and the slider in such a way that a light from the light source can enter the optical system and the adhesion material layer is sandwiched therebetween; irradiating the adhesion material layer with a light including the predetermined wavelength through the unit substrate; and bonding them. The adhesion material layer melted by the light including the predetermined wavelength and transmitted through the unit substrate can ensure high alignment accuracy as well as higher bonding strength and less change with time.

10 Claims, 8 Drawing Sheets

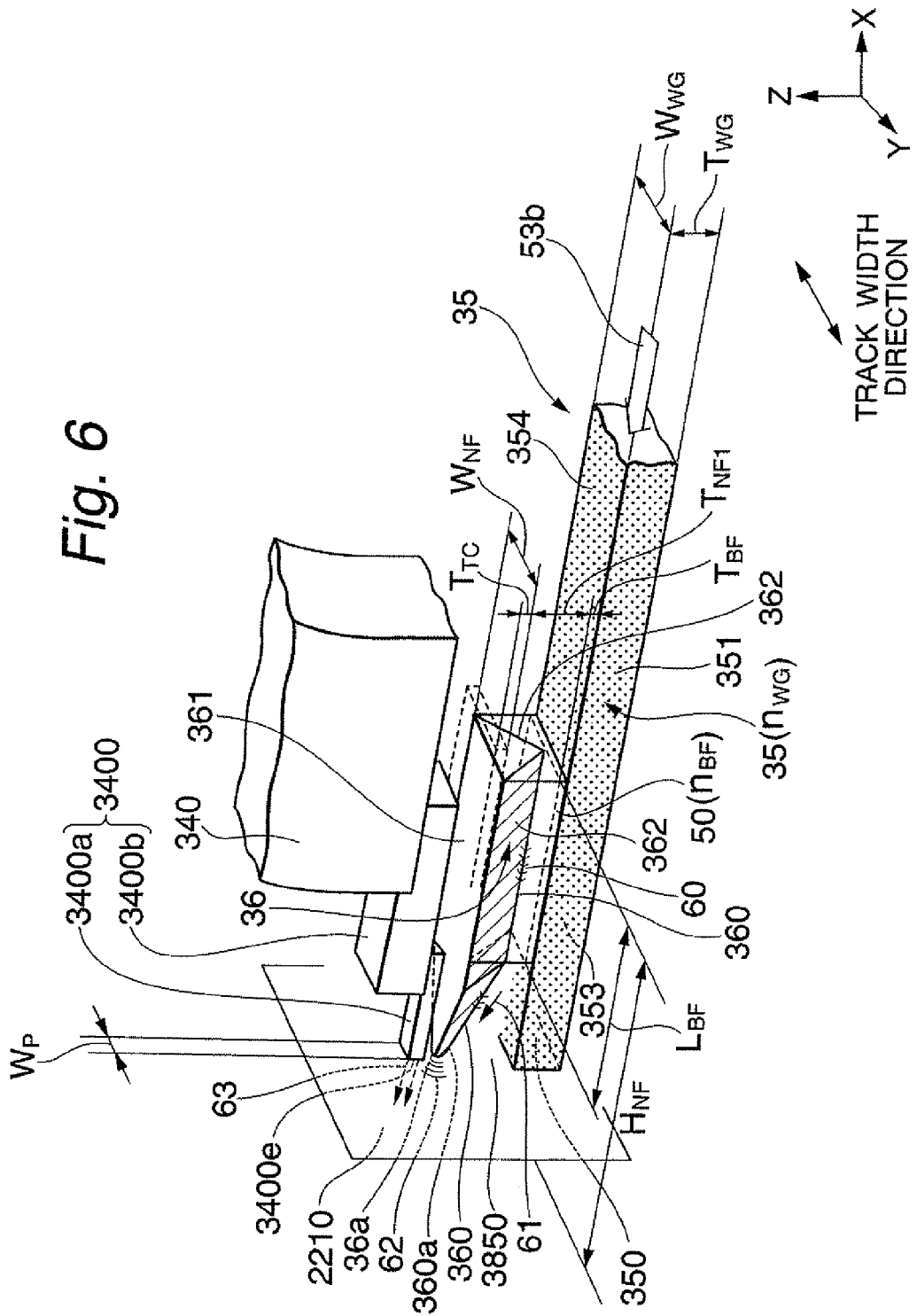

METHOD FOR MANUFACTURING THERMALLY-ASSISTED MAGNETIC RECORDING HEAD COMPRISING LIGHT SOURCE UNIT AND SLIDER

BACKGROUND OF THE INVENTION

1. Field of the Invention

The present invention relates to a thermally-assisted magnetic recording head constituted by joining a light source unit including a light source that emits light for performing thermally-assisted magnetic recording and a slider, and relates to a method for manufacturing the thermally-assisted magnetic recording head.

2. Description of the Related Art

As the recording densities of magnetic recording apparatuses become higher, as represented by magnetic disk apparatuses, further improvement has been required in the performance of thin-film magnetic heads and magnetic recording media. The magnetic recording medium is generally a kind of discontinuous body of magnetic grains gathered together, and each of the magnetic grains has a single magnetic domain structure. Here, one record bit consists of a plurality of the magnetic grains. Therefore, in order to improve the recording density, it is necessary to decrease the size of the magnetic grains and reduce irregularity in the boundary of the record bit. However, the decrease in size of the magnetic grains raises a problem of degradation in thermal stability of the magnetization due to the decrease in volume.

As a measure against the thermal stability problem, it may be possible to increase the magnetic anisotropy energy $K_U$ of the magnetic grains. However, the increase in energy $K_U$ causes the increase in anisotropic magnetic field (coercive force) of the magnetic recording medium. Whereas, the intensity of write field generated from the thin-film magnetic head is limited almost by the amount of saturation magnetic flux density of the soft-magnetic material of which the magnetic core of the head is formed. As a result, the head cannot write data to the magnetic recording medium when the anisotropic magnetic field of the medium exceeds the write field limit.

Recently, as a method for solving the problem of thermal stability, so-called a thermally-assisted magnetic recording technique is proposed. In the technique, a magnetic recording medium formed of a magnetic material with a large energy $K_U$ is used so as to stabilize the magnetization, then anisotropic magnetic field of a portion of the medium, where data is to be written, is reduced by heating the portion; just after that, writing is performed by applying write field to the heated portion.

In this thermally-assisted magnetic recording technique, there has been generally used a method in which a magnetic recording medium is irradiated and thus heated with a light such as near-field light (NF-light). In this case, it is significantly important to stably supply a light with a sufficiently high intensity at a desired position on the magnetic recording medium. However, from the beginning, more significant problem to be solved exists in where and how a light source with a sufficiently high output of light should be disposed inside a head.

As for the setting of the light source, for example, U.S. Pat. No. 7,538,978 B2 discloses a configuration in which a laser unit including a laser diode is mounted on the back surface of a slider, and US Patent Publication No. 2008/0056073 A1 discloses a configuration in which a structure of a laser diode element with a monolithically integrated reflection mirror is mounted on the back surface of a slider. Further, US Patent Publication No. 2005/0213436 A1 discloses a structure of slider that is formed together with a semiconductor laser, and Robert E. Rottmayer et al. "Heat-Assisted Magnetic Recording" IEEE TRANSACTIONS ON MAGNETICS, Vol. 42, No. 10, p. 2417-2421 (2006) discloses a configuration in which a diffraction grating is irradiated with a light generated from a laser unit provided within a drive apparatus.

As described above, various types of the setting of the light source are suggested. However, the present inventors propose a thermally-assisted magnetic recording head with a "composite slider structure" which is constituted by joining a light source unit provided with a light source to the end surface (back surface) of a slider provided with a write head element, the end surface being opposite to the opposed-to-medium surface of the slider. The "composite slider structure" is disclosed in, for example, US Patent Publication No. 2008/043360 A1 and US Patent Publication No. 2009/052078 A1. The advantages of the thermally-assisted magnetic recording head with the "composite slider structure" are as follows:

a) The head has an affinity with the conventional manufacturing method of thin-film magnetic heads because the opposed-to-medium surface and the element-integration surface are perpendicular to each other in the slider.

b) The light source can avoid suffering mechanical shock directly during operation because the light source is provided far from the opposed-to-medium surface.

c) The light source such as a laser diode and the head elements can be evaluated independently of each other; thus the degradation of manufacturing yield for obtaining the whole head can be avoided; whereas, in the case that all the light source and head elements are provided within the slider, the manufacturing yield rate for obtaining the whole head is likely to decrease significantly due to the multiplication of the process yield for the light-source and the process yield for the head elements.

d) The head can be manufactured with reduced man-hour and at low cost, because of no need to provide the head with optical components such as a lens or prism which are required to have much high accuracy, or with optical elements having a special structure for connecting optical fibers or the like.

In the head having the "composite slider structure", light emitted from the light-emission center located in the light-emitting surface of the light source needs to be incident accurately on the light-receiving end of an optical system such as a waveguide located on the back surface of the slider to achieve sufficiently high light use efficiency. Therefore, the light-emission center and the light-receiving end need to be aligned with each other as accurately as possible both in the track width direction and the direction perpendicular to the track width direction. It is preferable that the accuracy of the alignment be within ±1 micrometer (μm) in actual manufacturing. Therefore, it is an important issue to properly align and bond a light source unit and a slider in manufacturing of a head having the "composite slide structure".

In particular, bonding of the light source unit and the slider needs to be performed in such a way that the bonding does not adversely affect the elements in the head while maintaining the achieved alignment accuracy. For example, if an organic adhesive such as an ultraviolet (UV) curable resin is used for the bonding, some measures should be taken to prevent the light source unit and the slider from being displaced with respect to each other in the process of curing the adhesive. In addition, considerations need to be made to prevent relative misalignment between the light source unit and the slider during use of the head after the adhesive has cured and bonding has been completed.

On the other hand, there is a method for bonding the light source unit and the slider by using an alloy as solder to join them with higher adhesive strength and less change with time. However, in the conventional soldering methods, the light source unit and the slider are heated in a heating unit in the process of melting solder and therefore exposed to a considerably high temperature for certain duration of time. Especially, the slider typically includes an electromagnetic transducer for writing data and an MR element for reading data. When these magnetic head elements are heated to a high temperature higher than 200° C., for example, the magnetic pole tends to thermally expand to protrude to an undesirable extent or an MR multilayer structure tends to degrade, which can result in defects.

For these reasons, it is critically important to find a more appropriate method for bonding the light source unit and the slider in manufacturing of a head having the "composite slider structure".

SUMMARY OF THE INVENTION

Some terms used in the specification will be defined before explaining the present invention. In a layered structure or an element structure formed in the element-integration surface of a slider substrate or in the source-installation surface of a unit substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to a trailing side and −Z side to a leading side. And Y-axis direction indicates a track width direction, and X-axis direction indicates a height direction.

According to the present invention, a method for manufacturing a thermally-assisted magnetic recording head is provided, in which a light source unit including a light source provided in a unit substrate and a slider including an optical system provided in a slider substrate are joined with each other, wherein the unit substrate is made of a material transmitting light having a predetermined wavelength and an adhesion material layer is formed on a surface of one or each of the light source unit and the slider, the manufacturing method comprising the steps of:

aligning the light source unit and the slider with each other in such a way that a light generated from the light source can enter the optical system and the adhesion material layer is sandwiched between the light source unit and the slider;

irradiating the adhesion material layer with a light including the predetermined wavelength through the unit substrate to melt the adhesion material layer; and bonding the light source unit and the slider with each other.

In the above-described manufacturing method of the thermally-assisted magnetic recording head, since the adhesion material layer can be melted by the light that includes a predetermined wavelength and has been transmitted through the unit substrate in bonding of the light source unit and the slider, high alignment accuracy can be achieved while joining with higher bonding strength and less change with time can be achieved.

Further, in the manufacturing method according to the present invention, it is preferable that the light source is activated, and the light source unit and the slider are aligned in such a way that the light generated from the light source enters the optical system. This alignment method is a so-called active alignment method, which can achieve high alignment accuracy. Furthermore, it is also preferable that the melting of the adhesion material layer by the irradiation of the light including the predetermined wavelength is assisted by heating the adhesion material layer to a high temperature with a heat generated from the activated light source.

In the alignment using the active alignment method according to the present invention, it is preferable that the adhesion material layer is repeatedly melted by irradiating the adhesion material layer with the lights including the predetermined wavelength from different directions through the unit substrate, to correct variations in relative positions of the light source unit and the slider caused by the melting of the adhesion material layer. In this preferable case, it is also preferable that the amount of displacement of the light source unit and the slider with respect to each other is obtained beforehand in the case that the adhesion material layer is irradiated with a predetermined one shot of each of the lights from different directions, then the number of shots of each of the lights from different directions is determined.

Further, in the manufacturing method according to the present invention, it is preferable that the slider comprises a magnetic head element configured to write and/or read data, and the slider substrate is made of a material having a lower thermal conductivity than a material of the unit substrate so that conduction of a heat generated by the irradiation of the light including the predetermined wavelength to the slider substrate is limited. By controlling the thermal conductivity of the slider substrate, irradiating the adhesion material layer with the light that includes the predetermined wavelength and has passed through the unit substrate and melting the layer, adverse influence of heat generated by the irradiation on the magnetic head element provided in the slider can be avoided. Further, it is also preferable that, during the alignment, a holding means to hold the light source unit is used as a heatsink for the heat generated by the irradiation of the light including the predetermined wavelength.

Further, in the manufacturing method according to the present invention, it is preferable that the unit substrate is made of a material selected from a group consisting of Si (silicon), GaAs (gallium arsenide) and SiC (silicon carbide), and a YAG laser light is used as the light including the predetermined wavelength. Here, YAG is the name of a crystal having a garnet structure, made of a composite oxide ($Y_3Al_5O_{12}$) of Y (yttrium) and Al (aluminum). Nd-YAG laser light can be obtained by using a YAG crystal in which a several percent of Y is replaced with Nd (neodymium) as the laser medium, and is widely used in research, industrial, medical and other applications. Furthermore, it is also preferable that the adhesion material layer is made of an alloy containing one element selected from a group consisting of gold (Au), silver (Ag), copper (cu), germanium (Ge), aluminum (Al) and magnesium (Mg).

According to the present invention, a thermally-assisted magnetic recording head is further provided, which comprises:

a light source unit comprising: a unit substrate made of a material transmitting light having a predetermined wavelength; and a light source provided in a source-installation surface of the unit substrate; and a slider comprising: a slider substrate made of a material having a lower thermal conductivity than a material of the unit substrate; a magnetic head element configured to write and/or read data and provided in an element-integration surface of the slider substrate; and an optical system configured to propagate a light from the light source to a magnetic recording medium and provided in the element-integration surface, the light source unit and the slider being bonded by an adhesion material layer melted and solidified with a light that includes the predetermined wavelength and has passed through the unit substrate.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIG. 6 shows a perspective view schematically illustrating the configuration of the waveguide, the surface plasmon generator and the main magnetic pole;

DESCRIPTION OF THE PREFERRED EMBODIMENTS

Figure 1:
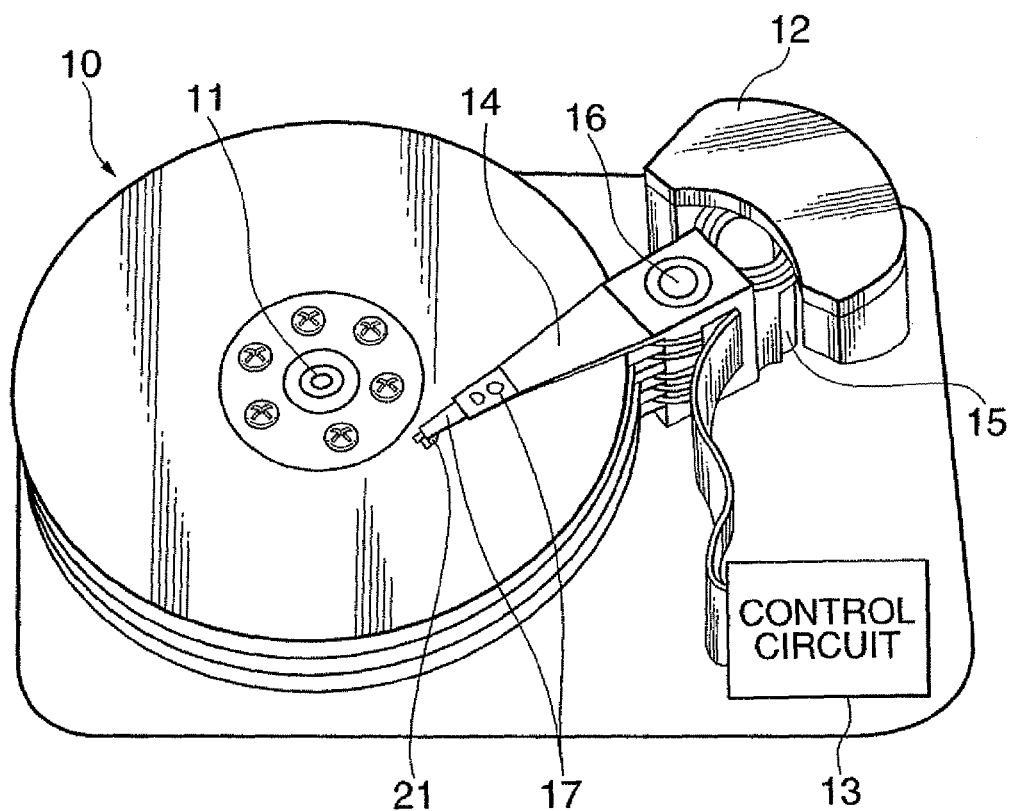
FIG. 1 shows a perspective view schematically illustrating a structure of a major part in one embodiment of a magnetic recording apparatus according to the present invention.
Figure 2:
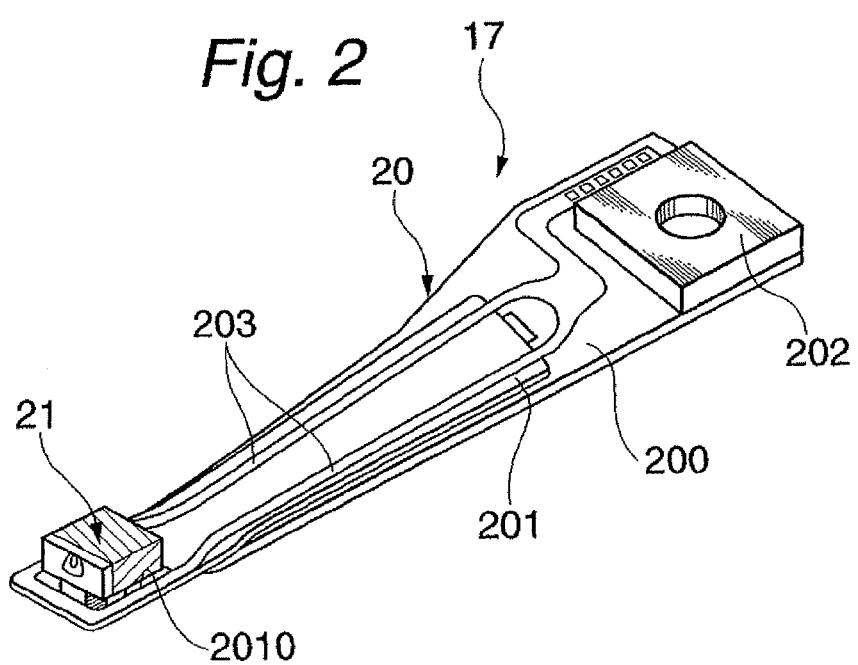
FIG. 2 shows a perspective view schematically illustrating a structure of a major part in one embodiment of a head gimbal assembly (HGA) according to the present invention.

FIG. 1 shows a perspective view schematically illustrating a structure of a major part in one embodiment of a magnetic recording apparatus according to the present invention. FIG. 2 shows a perspective view schematically illustrating a structure of a major part in one embodiment of a head gimbal assembly (HGA) according to the present invention. In FIG. 2, the side of the HGA opposed to the surface of the magnetic disk is presented as the upper side.

A magnetic disk apparatus as a magnetic recording apparatus shown in FIG. 1 includes: a plurality of magnetic disks 10 rotating around a rotational axis of a spindle motor 11; an assembly carriage device 12 provided with a plurality of drive arms 14 thereon; an HGA 17 attached on the top end portion of each drive arm 14 and provided with a thermally-assisted magnetic recording head 21; and a recording/reproducing and light-emission control circuit 13 for controlling write/read operations of the thermally-assisted magnetic recording head 21 and further for controlling the emission operation of a laser diode as a light source that generates laser light for thermally-assisted magnetic recording, which will be described later.

The magnetic disk 10 is, in the present embodiment, designed for perpendicular magnetic recording, and has a structure in which, for example, sequentially stacked on a disk substrate is: a soft-magnetic under layer; an intermediate layer; and a magnetic recording layer (perpendicular magnetization layer). The assembly carriage device 12 is a device for positioning the thermally-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and sliders 21 may be one.

Referring to FIG. 2, a suspension 20 in the HGA 17 includes a load beam 200, a flexure 201 with elasticity fixed to the load beam 200, a base plate 202 provided on the base portion of the load beam 200, and a wiring member 203 provided on the flexure 201 and made up of lead conductors and connection pads electrically joined to both ends of the lead conductors. The thermally-assisted magnetic recording head 21 is fixed to the flexure 201 at the top end portion of the suspension 20 so as to face the surface of each magnetic disk 10 with a predetermined space (flying height). Here, an aperture 2010 is provided in the flexure 201; the thermally-assisted magnetic recording head 21 is fixed in such a way that a part of the head 21 (light source unit 23 in FIG. 3) protrudes from the opposite side of the aperture 2010. Moreover, one ends (connection pads) of the wiring member 203 are electrically connected to terminal electrodes of the thermally-assisted magnetic recording head 21. The structure of the suspension 20 is not limited to the above-described one. An IC chip for driving the head may be mounted midway on the suspension 20, though not shown.

Figure 3:
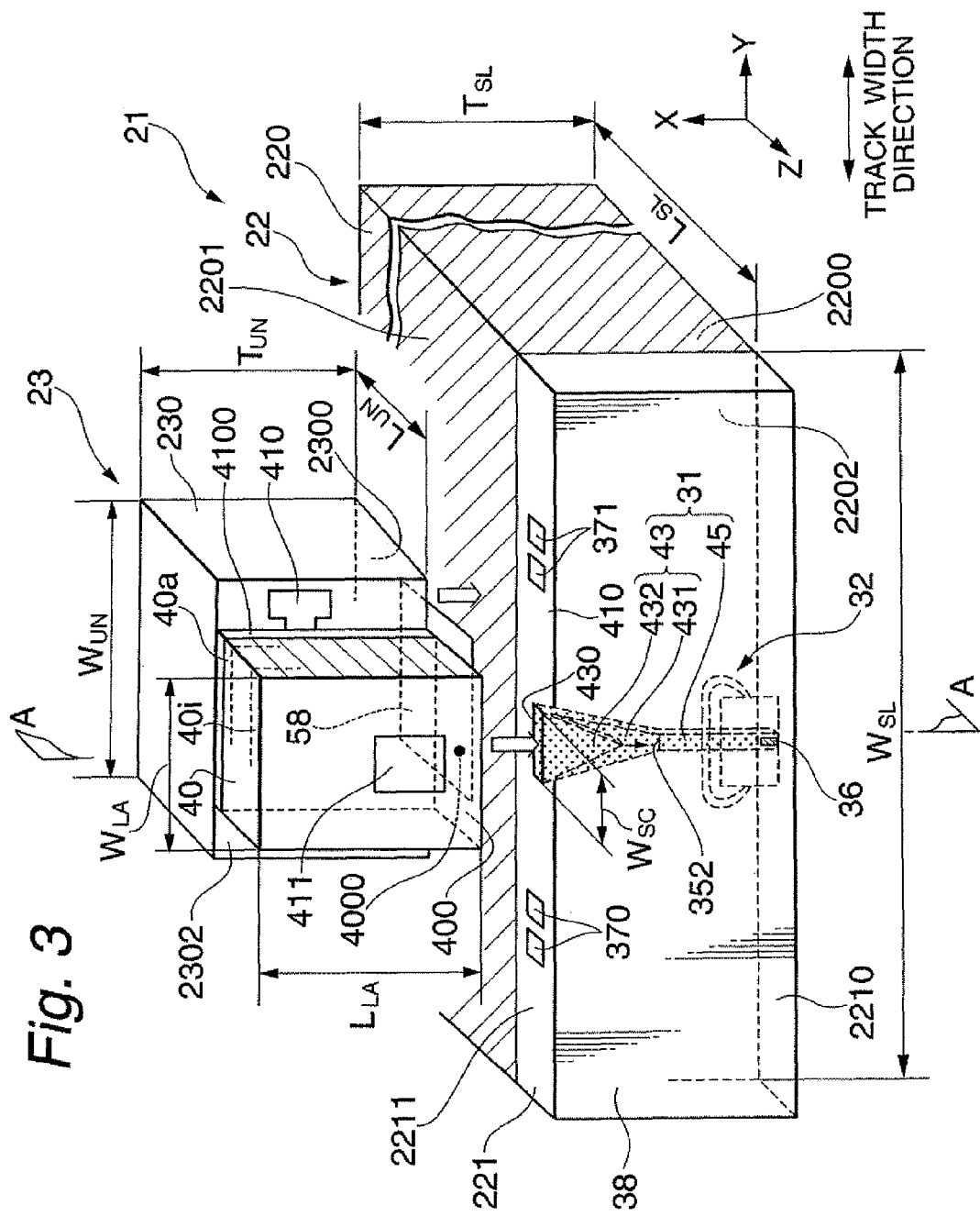
FIG. 3 shows a perspective view illustrating one embodiment of the thermally-assisted magnetic recording head according to the present invention.

FIG. 3 shows a perspective view illustrating one embodiment of the thermally-assisted magnetic recording head 21 according to the present invention.

As shown in FIG. 3, a thermally-assisted magnetic recording head 21 is constituted by aligning and joining a light source unit 23 that includes a laser diode 40 and a slider 22 that includes an optical system 31. The slider 22 includes: a slider substrate 220 having an air bearing surface (ABS) 2200 processed so as to provide an appropriate flying height; and a head element part 221 formed on an element-integration surface 2202 that is perpendicular to and adjacent to the ABS 2200. While, the light source unit 23 includes: a unit substrate 230 having an joining surface 2300; and a laser diode 40 as a light source provided on a source-installation surface 2302 that is perpendicular to and adjacent to the joining surface 2300. The slider 22 and the light source unit 23 are bonded to each other in such a way that the back surface 2201 of the slider substrate 220 and the joining surface 2300 of the unit substrate 230 are opposed to each other and sandwich a solder layer 58 as an adhesion material layer formed of a material used for adhesion therebetween.

Here, the unit substrate 230 is made of a material that transmits a laser light used for bonding the light source unit 23 and the slider 22 together, which will be described in detail later. If Nd-YAG laser light (wavelength: 1064 nanometers (nm)), which will be described later, is used, the unit substrate 230 is preferably made of a material that has a transmittance greater than or equal to 50% at a wavelength of 1064 nm, such as Si (transmittance: 67%), GaAs (transmittance: 66%), or SiC (transmittance: 80%). This ensures the bonding between the light source unit 23 and the slider 22 using laser light, which will be described later.

The slider substrate 220 is preferably made of a material that has a lower thermal conductivity than the material of the unit substrate 230 for reasons that will be described later. For example, if the unit substrate 230 is made of Si (thermal conductivity: 168 W/(m·K)), the slider substrate 220 is preferably made of a material such as AlTic (Al$_2$O$_3$-Tic) (thermal conductivity: 19.0 W/(m·K)) or SiO$_2$ (thermal conductivity: 10.7 W/(m·K)). This can minimize adverse influence of heat on a magnetic head element 32, the heat being generated by laser irradiation used for bonding between the light source unit 23 and the slider 22.

A solder layer 58, which is an adhesion material layer formed of a material melted and solidified with laser light that has passed through the unit substrate 230, bonds the light source unit 23 and the slider 22 together. The solder layer 58 is preferably made of an alloy containing one element selected from the group consisting of Au (gold), Ag (silver), Cu (copper), Ge (germanium), Al (aluminum) and Mg (magnesium) that has a melting point of lower than 400° C. Here, the solder layer 58 has a higher thermal conductivity than the slider substrate 220, and heat generated by laser irradiation can be used more in melting the solder layer 58 than being conducted to the slider substrate 220. The thickness of the solder layer 58 may be in the range of approximately 0.05 to 5.0 micrometers (μm), for example.

As also shown in FIG. 3, in the slider 22, the head element part 221 formed on the element-integration surface 2202 of the slider substrate 220 includes: a head element 32 constituted of a magnetoresistive (MR) element 33 for reading data from the magnetic disk 10 (FIG. 1) and an electromagnetic transducer 34 for writing data to the magnetic disk; a spot-size converter 43 that receives a laser light emitted from the laser diode 40, changes (reduces) the spot size of the laser light, then guides the laser light into the waveguide 35; a waveguide 35 that guides the laser light with changed spot size to the head end surface 2210 as an opposed-to-medium surface or its vicinity; a surface plasmon generator 36 that generates near-field light (NF-light) for thermal assist; and an overcoat layer 38 formed on the element-integration surface 2202 so as to cover the head element 32, the spot-size converter 43, the waveguide 35 and the surface plasmon generator 36. Here, the spot-size converter 43, the waveguide 35 and the surface plasmon generator 36 constitute the optical system 31 for generating NF-light in the head 21 (head element part 221).

Further, the slider 22 includes a pair of terminal electrodes 370 and a pair of terminal electrodes 371, which are provided for the head element 32, formed on the end surface 2211 of the head element part 221, the end surface 2211 being on the side opposite to the opposed-to-medium surface (head end surface) 2210. Further, the light source unit 23 includes a terminal electrode 410 connected electrically to an n-electrode layer 40a of the laser diode 40 and provided on the source-installation surface 2302. The light source unit 23 further includes a terminal electrode 411 connected electrically to a p-electrode, layer 40i of the laser diode 40 and provided on the p-electrode layer 40i. These terminal electrodes 370, 371, 410 and 411 are electrically connected to the connection pads of the wiring member 203 provided on the flexure 201 by wire bonding, by solder ball bonding (SBB) or the like.

One ends of the MR element 33, the electromagnetic transducer 34 and the surface plasmon generator 36 reach the head end surface 2210 as an opposed-to-medium surface. Here, the head end surface 2210 and the ABS 2200 constitute the whole opposed-to-medium surface of the thermally-assisted magnetic recording head 21. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic record layer of the magnetic disk 10 with a appropriate magnetic spacing. Then, MR element 33 reads data by sensing signal magnetic field from the magnetic record layer, and the electromagnetic transducer 34 writes data by applying signal magnetic field to the magnetic record layer. When writing data, laser light, which is generated from the laser diode 40 of the light source unit 23 and propagates through the spot-size converter 43 and the waveguide 35, is changed into NF-light in the surface plasmon generator 36. Then, a portion to be written of the magnetic recording layer is irradiated and thus heated with the NF-light. As a result, the anisotropic magnetic field (coercive force) of the portion is decreased to a value that enables writing; thus the thermally-assisted magnetic recording can be achieved by applying write field with use of the electromagnetic transducer 34 to the anisotropic-field-decreased portion.

Referring also to FIG. 3, a spot-size converter 43 is an optical element which receives laser light emitted from the laser diode 40 at its light-receiving end surface 430 having a width $W_{SC}$ in the track width direction (the Y-axis direction), converts the laser light to laser light with a smaller spot diameter with a low loss while maintaining a single mode, and then guides the converted laser light to a light-receiving end surface 352 of the waveguide 35. Here, the single-mode is a mode in which the laser light propagating within the spot-size converter 43 has a beam cross-section with a shape of circle or ellipsoid, and the light intensity distribution in the cross-section is single-peaked, especially a Gaussian. Laser light with a single mode can become a stable laser light with an intended intensity even in the case that the spot size of the laser light is converted into a smaller one due to the propagation through the spot-size converter 43. The spot-size converter 43 in the present embodiment includes a lower propagation layer 431 and an upper propagation layer 432. The lower propagation layer 431 has a width in the track width direction (Y-axis direction) that gradually decreases from the width $W_{SC}$ along the traveling direction (−X direction) of laser light incident through the light-receiving end surface 430. The upper propagation layer 432 is stacked on the lower propagation layer 431 and has a width in the track width direction (Y-axis direction) that more steeply decreases from the width $W_{SC}$ along the traveling direction (−X direction) of laser light than the lower propagation layer 431. Laser light incident through the light-receiving end surface 430 is converted to laser light with a smaller spot size as the laser light propagates through the layered structure, and reaches the light-receiving end surface 352 of the waveguide 35.

The width $W_{SC}$ of the spot-size converter 43 at the light-receiving end surface 430 may be in the range of approximately 1 to 10 μm (micrometers), for example. The thickness $T_{SC}$ (in Z-axis direction) at the light-receiving end surface 430 may be in the range of approximately 1 to 10 μm, for example. The light-receiving end surface 430 is preferably inclined at a predetermined acute angle, for example at an angle of approximately 4° (degrees) with respect to the end surface 400 including the light-emission center 4000 of the laser diode 40. Such angle prevents laser light reflected by the light-receiving end surface 430 from returning to the light-emission center 4000. The spot-size converter 43 is made of a material with a refractive index higher than the refractive index $n_{OC}$ of the constituent material of the surrounding overcoat layer 38. The spot-size converter 43 can be formed from the same dielectric material as the waveguide 35, which will be described below. In the case, the spot-size converter 43 and the waveguide 35 may be formed integrally.

The waveguide 35 in the present embodiment extends in parallel with the element-integration surface 2202 from the light-receiving end surface 352 that receives laser light emitted from the spot-size converter 43 to the end surface 350 on the head end surface 2210 side. Here, the end surface 350 may be a portion of the head end surface 2210, or may be recessed from the head end surface 2210 with a predetermined distance. A portion of one side surface of the waveguide 35 near the end surface 350 faces a surface plasmon generator 36. This allows laser light (waveguide light) incident through the light-receiving end surface 352 and traveling through the waveguide 35 to reach the portion facing the surface plasmon generator 36, thereby to be coupled with the generator 36 in a surface plasmon mode.

Referring again to FIG. 3, a unit electrode 4100 is provided on the source-installation surface 2302 of the unit substrate 230 of the light source unit 23. The unit electrode 4100 may be formed by a foundation layer of a material such as Ta or Ti with a thickness of approximately 10 nm, for example, and a conducting layer of a conductive material such as gold (Au), copper (Cu) or an alloy of Au with a thickness in the range of approximately 1 to 5 µm, for example. In an alternative, the unit electrode 4100 may be formed by depositing a solder material such as Au—Sn alloy on the source-installation surface 2302 by an evaporation method, for example. The terminal electrode 410 is electrically connected with the n-electrode layer 40$a$ of the laser diode 40 through the unit electrode 4100, the n-electrode layer 40$a$ being connected with the unit electrode 4100. The terminal electrode 411 may be a conductive layer formed on the p-electrode layer 40$i$ of the laser diode 40, and made of, for example, Au, Cu or Au alloy with a thickness in the range of approximately 1 to 5 µm. When a predetermined voltage is applied between the n-electrode layer 40$a$ and a p-electrode layer 40$i$ of the laser diode 40 through these terminal electrodes 410 and 411, the laser diode 40 oscillates and laser light is emitted from the light-emission center 4000.

As also shown in FIG. 3, the slider substrate 220 is, for example, a so-called Femto slider having a thickness (in X-axis direction) $T_{SL}$ of 230 µm, a width $W_{SL}$ of 700 µm in the track width direction (Y-axis direction), and a length $L_{SL}$, (in Z-axis direction) of 850 µm. The Femto slider is commonly used as the substrate of a thin-film magnetic head capable of achieving a high recording density and is the smallest in standardized size among the currently used sliders. On the other hand, the unit substrate 230 is somewhat smaller than the slider substrate 220. In particular, the width W of the unit substrate 230 in the track width direction (Y-axis direction) is preferably smaller than the width $W_{UN}$ of the slider substrate 220, greater than or equal to the width $W_{LA}$, of the laser diode 40 in the track width direction (Y-axis direction). Further, the length $L_{UN}$ (in Z-axis direction) of the unit substrate 230 is preferably smaller than the length $L_{SL}$ of the slider substrate 220. The width/length setting enables a laser light for melting the solder layer 58 to reach the solder layer 58 by being transmitted through the unit substrate 230 without irradiating and heating the slider substrate 220 with the laser light during the transmission, as described in detail later. Considering the requirements described above, the unit substrate 230 may have a thickness $T_{UN}$ (in X-axis direction) of 320 µm, a width $W_{UN}$ in the track width direction of 350 µm, and a length $L_{UN}$ (in Z-axis direction) of 250 µm, for example.

As described above, the thermally-assisted magnetic recording head 21 has the structure in which the slider 22 and the light source unit 23 are interconnected. Thus, the slider 22 and the light source unit 23 can be separately fabricated and then combined together to fabricate the head 21. Consequently, the production yield of the entire heads is about the same as the production yield of the sliders 22 if performance evaluation of the light source units 23 is performed prior to the fabrication of the heads and only good light source units 23 are used for the fabrication of the heads. Thus, the reduction of production yield of the entire heads due to the rejection rate of the laser diodes 40 can be avoided. Furthermore, since the light source unit 23 is attached to the back surface 2201 of the slider 22 which is opposite to the ABS 2200 of the slider 22, the laser diode 40 can be always disposed in a location far from the ABS 2200. As a result, direct mechanical impact on the laser diode 40 in operation can be avoided. Moreover, since the ABS 2200 of the slider 22 is perpendicular to the element-integration surface 2202, the slider 22 has a high affinity for conventional thin-film magnetic head fabrication processes. Since an optical part that requires a considerably high accuracy such as an optical pickup lens or an optical part that requires a special structure for connection such as an optical fiber do not need to be provided in the thermally-assisted magnetic recording head 21, the number of man-hours and thus costs can be reduced.

Figure 4:
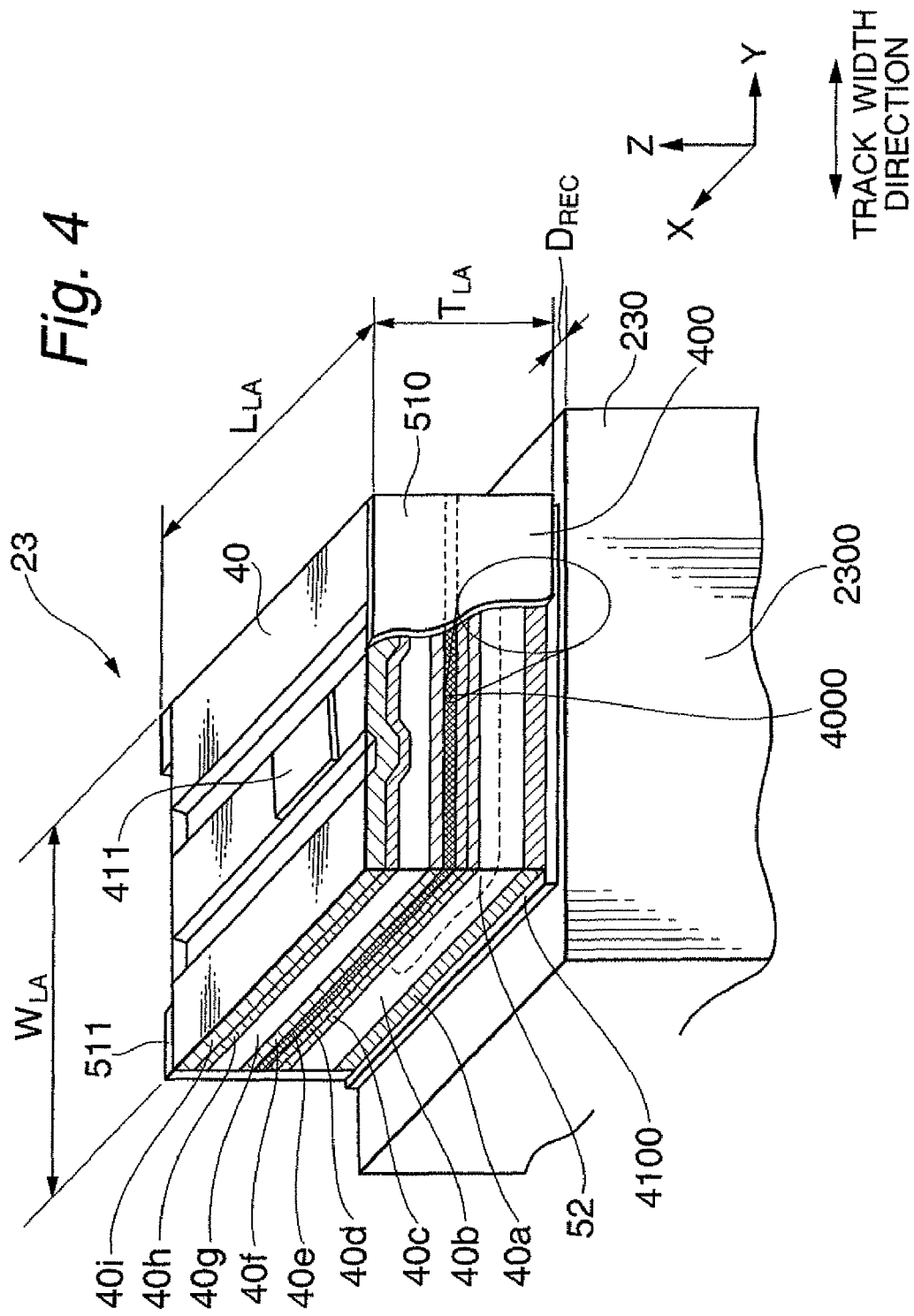
FIG. 4 shows a perspective view illustrating the structure of the laser diode and the state of joining the laser diode to the unit substrate.

FIG. 4 shows a perspective view illustrating the structure of the laser diode 40 and the state of joining the laser diode 40 to the unit substrate 230.

According to FIG. 4, the laser diode 40 is, in the present embodiment, of edge-emitting type. As the laser diode 40, InP base, GaAs base or GaN base diodes can be utilized, which are usually used for communication, optical disk storage, or material analysis. The wavelength $\lambda_L$ of the emitted laser light may be, for example, in the range of approximately 375 nm to 1.7 µm. For example, a laser diode of InGaAsP/InP quaternary mixed crystal can be used, in which possible wavelength region is set to be from 1.2 to 1.67 µm. Here, the laser diode 40 shown in FIG. 4 has a multilayered structure in which sequentially stacked from the unit substrate 230 side is: an n-electrode layer 40$a$ having a surface contact and bonded with the unit electrode 4100; an n-GaAs substrate 40$b$; an n-InGaAlP clad layer 40$c$; the first InGaAlP guide layer 40$d$; an active layer 40$e$ formed of multiquantum well (InGaP/InGaAlP) or the like; the second InGaAlP guide layer 40$f$; an p-InGaAlP clad layer 40$g$; a p-electrode base layer 40$h$; and a p-electrode layer 40$i$.

The n-electrode layer 40$a$ and the p-electrode layer 40$i$ may be formed of, for example, Au or Au alloy with thickness of approximately 5 µm. Alternatively, the p-electrode layer 40$i$ may be bonded to the unit substrate 4100 by turning the laser diode 40 upside down. Further, on the front and rear cleaved surfaces of the multilayered structure of the laser diode 40, respectively formed are reflective layers 510 and 511 for exciting the oscillation by total reflection. The outer surface of the reflective layer 510 on the joining surface 2300 side is a light-emission surface 400. The laser diode 40 has a width $W_{LA}$ of, for example, approximately 150 to 250 µm. The length $L_{LA}$ of the laser diode 40 corresponds approximately to a cavity length that is the distance between the reflective layers 510 and 511, and is, for example, 300 µm. The length $L_{LA}$ is preferably 300 µm or more in order to obtain a sufficient high output. Further, the height $T_{LA}$ of the laser diode 40 is, for example, approximately 60 to 200 µm.

An electric source provided within the magnetic disk apparatus can be used for driving the laser diode 40. In fact, the magnetic disk drive apparatus usually has an electric source with applying voltage of, for example, approximately 2 to 5V, which is sufficient for the laser oscillation. Even in the case that the amount of electric power consumption of the laser diode 40 is, for example, in the vicinity of one hundred mW, the amount can be covered sufficiently by the electric source provided within the magnetic disk apparatus.

Referring again to FIG. 4, the n-electrode layer 40a of the laser diode 40 and the unit electrode 4100 of the unit substrate 230 can be bonded to each other by soldering using one of lead-free solders such as Au—Sn alloy 52. Here, preferably the laser diode 40 is bonded onto the unit substrate 230 in such a way that the distance $D_{REC}$ (in X-axis direction) between the light-emitting surface 400 of the laser diode 40 and the joining surface 2300 is 0 or more, and 5 μm or less. Since the distance $D^{REC}$ is greater than or equal to 0, the laser diode 40 does not protrude from the light source unit 23. Consequently, the laser diode 40 is prevented from being subjected to excessive mechanical stress and damage during bonding. Furthermore, since the direction D is less than or equal to 5 μm, the distance between the light-emission center 4000 and the light-receiving end surface 430 of the optical system 31 (FIG. 3) of the slider 22 is sufficiently small and therefore a high light use efficiency can be provided.

Figure 5:
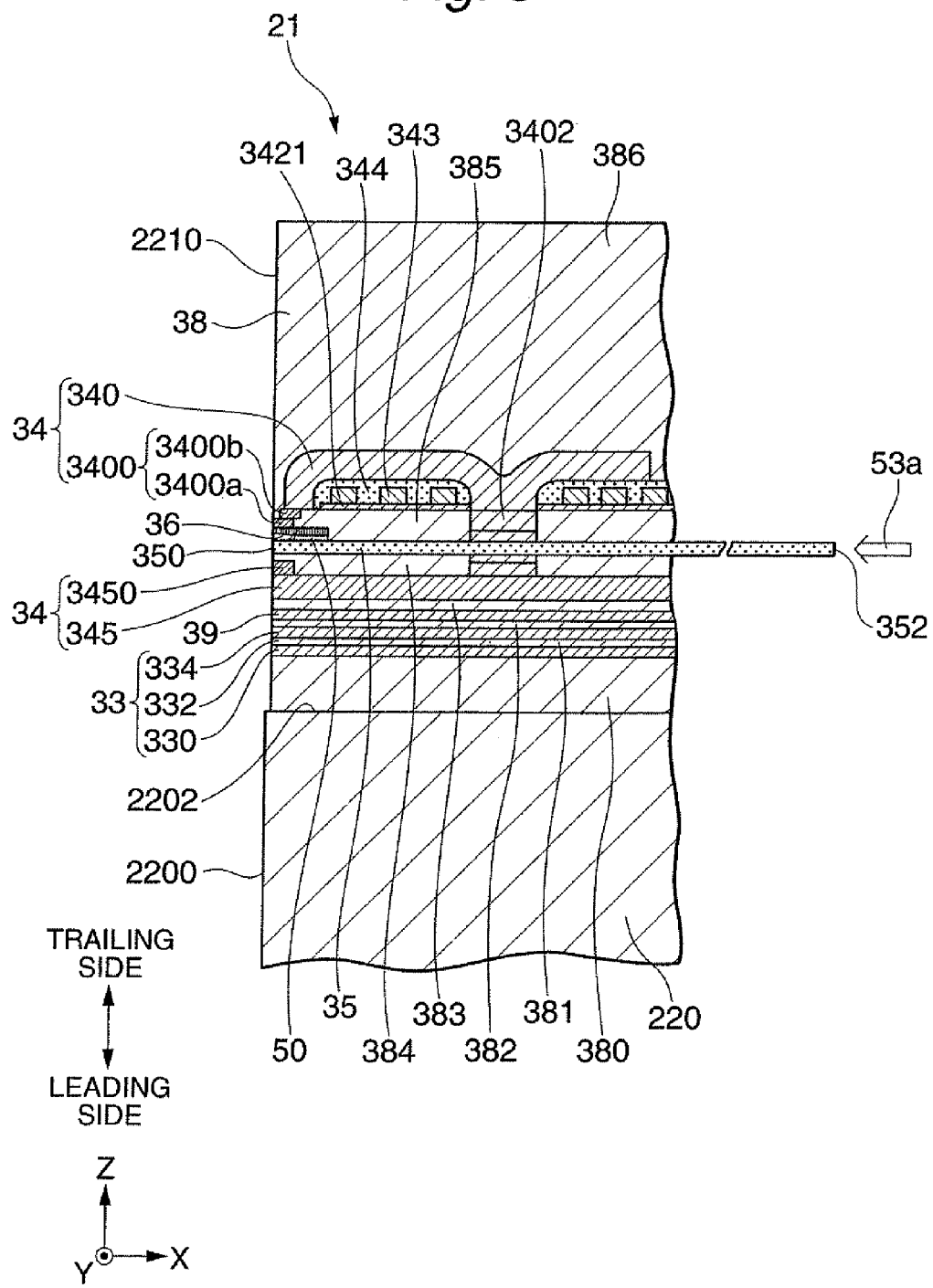
FIG. 5 shows a cross-sectional view taken by plane A in FIG. 3, schematically illustrating the configuration of the head element and its vicinity in the thermally-assisted magnetic recording head.

FIG. 5 shows a cross-sectional view taken by plane A in FIG. 3, schematically illustrating the configuration of the head element 32 and its vicinity in the thermally-assisted magnetic recording head 21.

As shown in FIG. 5, the MR element 33 is formed on a base layer 380 that is formed of an insulating material such as $Al_2O_3$ (alumina), $SiO_2$ and stacked on the element-integration surface 2102. The MR element 33 includes: an MR multilayer 332; and a lower shield layer 330 and an upper shield layer 334 which sandwich the MR multilayer 332 and an insulating layer 381 therebetween. The MR multilayer 332 is a magneto-sensitive part for detecting signal magnetic field by utilizing MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. In the case that the MR multilayer 332 is a CPP-GMR multilayer or a TMR multilayer, the upper and lower shield layers 334 and 330 act as electrodes as well as magnetic shields.

Referring also to FIG. 5, the electromagnetic transducer 34 is designed for perpendicular magnetic recording, and includes an upper yoke layer 340, a main magnetic pole 3400, a write coil layer 343, a coil-insulating layer 344, a lower yoke layer 345, and a lower shield 3450.

The upper yoke layer 340 is formed so as to cover the coil-insulating layer 344, and the main magnetic pole 3400 is formed on an insulating layer 385 made of an insulating material such as $Al_2O_3$ (alumina). These upper yoke layer 340 and main magnetic pole 3400 are magnetically connected with each other, and acts as a magnetic path for converging and guiding magnetic flux toward the magnetic recording layer (perpendicular magnetization layer) of the magnetic disk 10 (FIG. 1), the magnetic flux being excited by write current flowing through the write coil layer 343. The main magnetic pole 3400 includes: a first main pole portion 3400a reaching the head end surface 2210 and having a small width $W_P$ (FIG. 6) in the track width direction; and a second main pole portion 3400b located on the first main pole portion 3400a and at the rear (+X side) of the portion 3400a. The first main pole portion 3400a has an end surface 3400e (FIG. 6) with a shape of, for example, a rectangle, a square or a trapezoid on the head end surface 2210. Here, the above-described width $W_P$ is the length of an edge in the track width direction (Y-axis direction) of the end surface 3400e, and defines the width of write field distribution in the track width direction (Y-axis direction). The width $W_P$, can be set to be, for example, 0.05 to 0.5 μm. The main magnetic pole 3400 is preferably formed of a soft-magnetic material with a saturation magnetic flux density higher than that of the upper yoke layer 340, which is, for example, an iron alloy containing Fe as a main component, such as FeNi, FeCo, FeCoNi, FeN or FeZrN. The thickness of the first main pole portion 3400a is, for example, in the range of approximately 0.1 to 0.8 μm.

The write coil layer 343 is formed on an insulating layer 385 made of an insulating material such as $Al_2O_3$ (alumina), in such a way as to pass through in one turn at least between the lower yoke layer 345 and the upper yoke layer 340, and has a spiral structure with a back contact portion 3402 as a center. The write coil layer 343 is formed of a conductive material such as Cu (copper). The write coil layer 343 is covered with a coil-insulating layer 344 that is formed of an insulating material such as a heat-cured photoresist and electrically isolates the write coil layer 343 from the upper yoke layer 340. The write coil layer 343 has a monolayer structure in the present embodiment; however, may have a two or more layered structure or a helical coil shape. Further, the number of turns of the write coil layer 343 is not limited to that shown in FIG. 5, and may be, for example, in the range from two to seven.

The back contact portion 3402 has a though-hole extending in X-axis direction, and the waveguide 35 and insulating layers that covers the waveguide 35 pass through the though-hole. In the though-hole, the waveguide 35 is away at a predetermined distance of, for example, at least 1 μm from the inner wall of the back contact portion 3402. The distance prevents the absorption of the waveguide light by the back contact portion 3402.

The lower yoke layer 345 is formed on an insulating layer 383 made of an insulating material such as $Al_2O_3$ (alumina), and acts as a magnetic path for the magnetic flux returning from a soft-magnetic under layer that is provided under the magnetic recording layer (perpendicular magnetization layer) of the magnetic disk 10. The lower yoke layer 345 is formed of a soft-magnetic material, and its thickness is, for example, approximately 0.5 to 5 μm. Further, the lower shield 3450 is a part of the magnetic path, being connected with the lower yoke layer 345 and reaching the head end surface 2210. The lower shield 3450 is opposed to the main magnetic pole 3400 through the surface plasmon generator 36, and acts for receiving the magnetic flux spreading from the main magnetic pole 3400. The lower shield 3450 has a width in the track width direction greatly larger than that of the main magnetic pole 3400. This lower shield 3450 causes the magnetic field gradient between the end portion of the lower shield 3450 and the first main pole portion 3400a to become steeper. As a result, jitter of signal output becomes smaller, and therefore, error rates during read operations can be reduced. The lower shield 3450 is preferably formed of a material with high saturation magnetic flux density such as NiFe (Permalloy) or an iron alloy as the main magnetic pole 3400 is formed of.

Referring also to FIG. 5, laser light 53a, the spot size of which the spot-size converter 43 changes (reduces), enters the waveguide 35 from the light-receiving end surface 352, and propagates through the waveguide 35. The waveguide 35 extends from the light-receiving end surface 352 to the end surface 350 on the head end surface 2210 side through the through-hole that is provided in the back contact portion 3402 and extends in X-axis direction. Furthermore, the surface plasmon generator 36 is a near-field (NF) generator that transforms the laser light (waveguide light) propagating through the waveguide 35 into NF-light. A part on the head end surface 2210 side of the waveguide 35 and the surface plasmon generator 36 are provided between the lower shield 3450 (lower yoke layer 345) and the main magnetic pole 3400 (upper yoke layer 340). Further, a portion of the upper surface (side surface) of the waveguide 35 on the head end surface 2210 side is opposed to a portion of the lower surface (including a propagative edge 360 (FIG. 6)) of the surface plasmon antenna 36 with a predetermined distance. The sandwiched portion between these portions constitutes a buffering portion 50 having a refractive index lower than that of the waveguide 35. The buffering portion 50 acts for coupling the laser light (waveguide light) that propagates through the waveguide 35 with the surface plasmon generator 36 in a surface plasmon mode. A detailed explanation of the waveguide 35, the buffering portion 50 and the surface plasmon generator 36 will be given later with reference to FIG. 6.

Further, also as shown in FIG. 5, an inter-element shield layer 39 is preferably provided between the MR element 33 and the electromagnetic transducer 34 (lower yoke layer 345), sandwiched by the insulating layers 382 and 383. The inter-element shield layer 39 plays a role for shielding the MR element 33 from the magnetic field generated from the electromagnetic transducer 34, and may be formed of a soft-magnetic material. Here, the above-described insulating layers 381, 382, 383, 384, 385 and 386 constitute the overcoat layer 38.

FIG. 6 shows a perspective view schematically illustrating the configuration of the waveguide 35, the surface plasmon generator 36 and the main magnetic pole 3400. In the figure, the head end surface 2210 is positioned at the left side, the surface 2210 including positions where write field and NF-light are emitted toward the magnetic recording medium.

As shown in FIG. 6, the configuration includes the waveguide 35 for propagating laser light (waveguide light) 53b used for generating NF-light toward the end surface 350, and the surface plasmon generator 36 that has a propagative edge 360 as an edge on which surface plasmon excited by the laser light (waveguide light) 53b propagates. The surface plasmon generator 36 further includes a near-field light generating (NFL-generating) end surface 36a that reaches the head end surface 2210 and is a destination for the excited surface plasmon. The propagative edge 360 extents to the NFL-generating end surface 36a. Further, a buffering portion 50 is a portion sandwiched between a portion of the side surface 354 of the waveguide 35 and a portion of the lower surface 362 including the propagative edge 360 of the surface plasmon generator 36. That is, the propagative edge 360 is covered with the buffering portion 50. The buffering portion 50 acts for coupling the waveguide light 53b with the surface plasmon generator 36 in a surface plasmon mode. Further, the propagative edge 360 plays a role of propagating the surface plasmon excited by the waveguide light 53b to the NFL-generating end surface 36a. Here, side surfaces of the waveguide 35 are defined as, out of end surfaces surrounding the waveguide 35, end surfaces other than the end surface 350 on the head end surface 2210 side and the light-receiving end surface 352 on the opposite side. These side surfaces serve as surfaces on which the propagating waveguide light 53b can be totally reflected in the waveguide 35 that corresponds to a core. In the present embodiment, the side surface 354 of the waveguide 35, a portion of which is in surface contact with the buffering portion 50, is the upper surface of the waveguide 35. And, the buffering portion 50 may be a portion of the overcoat layer 38 (FIG. 2), or may be provided as a new layer other than the overcoat layer 38.

Specifically, the waveguide light 53b, which has advanced to near the buffering portion 50, is involved with the optical configuration including the waveguide 35 with a refractive index $n_{WG}$, the buffering portion 50 with a refractive index $n_{BF}$ and the surface plasmon generator 36 made of a metal, and induces a surface plasmon mode on the propagative edge 360 of the surface plasmon generator 36. That is, the waveguide light couples with the surface plasmon generator 36 in a surface plasmon mode. The induction of the surface plasmon mode becomes possible by setting the refractive index $n_{BF}$ of the buffering portion 50 to be smaller than the index $n_{WG}$ of the waveguide 35 ($n_{BF}F<n_{WG}$). Actually, evanescent light is excited within the buffering portion 50 under an optical boundary condition between the waveguide 35 as a core and the buffering portion 50. Then, the evanescent light couples with the fluctuation of electric charge excited on the metal surface (propagative edge 360) of the surface plasmon generator 36, and induces the surface plasmon mode, thereby there is excited surface plasmon 60. Here, the propagative edge 360 is located closest to the waveguide 35 on the inclined lower surface 362 of the surface plasmon generator 36, and is just an edge where electric field tends to converge; thus surface plasmon can easily be excited on the edge 360. The propagative edge 360 is preferably made rounded to prevent surface plasmon 60 from running off from the edge 360, and thus to prevent the degradation of light use efficiency.

In the light source and optical system as shown in FIGS. 3, 5 and 6, the laser light emitted from the light-emission surface 400 of the laser diode 40 preferably has TM-mode polarization in which the oscillation direction of electric field of the laser light is along Z-axis. Further, the waveguide light 53b accordingly have a linear polarization in which the oscillation direction of electric field of the laser light is Z-axis direction, that is, perpendicular to the layer surface of the waveguide 35. Setting the polarization enables the waveguide light 53b propagating through the waveguide 35 to be coupled with the surface plasmon generator 36 in a surface plasmon mode.

Further, as also shown in FIG. 6, the surface plasmon generator 36, in the present embodiment, tapers in the height direction (Z-axis direction) near the head end surface 2210 toward the NFL-generating end surface 36a. Further, the surface plasmon generator 36 has, in the present embodiment, a cross-section taken by YZ plane with a triangular shape, and the NFL-generating end surface 36a especially has an isosceles triangle shape in which one apex on the leading side (−Z side) is the end of the propagative edge 360. Thus, surface plasmon 60 propagating on the propagative edge 360 reaches the NFL-generating end surface 36a having an apex 360a as a destination of the edge 360. As a result, the surface plasmon 60, namely, electric field converges in the NFL-generating end surface 36a. Thereby NF-light 62 is emitted from the end surface 36a toward the magnetic recording layer of the magnetic disk 10, and reaches the surface of the magnetic disk 10 to heat a portion of the magnetic recording layer of the disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, the thermally-assisted magnetic recording can be accomplished.

Further, the side surfaces of the waveguide 35: the upper surface 354, the lower surface 353, and both the side surfaces 351 in the track width direction (Y-axis direction) have a surface contact with the overcoat layer 38 (FIG. 3), that is, the insulating layers 384 and 385 (FIG. 5), except a portion having a surface contact with the buffering portion 50. Here, the waveguide 35 is formed of a material with a refractive index $n_{WG}$ higher than the refractive index $n_{OC}$ of the constituent material of the overcoat layer 38, made by using, for example, a sputtering method. This material design causes the waveguide 35 to act as a core, and causes the overcoat layer 38 to act as a clad. For example, in the case that the wavelength $\lambda_L$ of the laser light is 600 nm and the overcoat layer 38 is formed of $Al_2O_3$ (n=1.63), the waveguide 35 can be formed of, for example, $SiO_XN_Y$ (n=1.7-1.85) or $Ta_2O_5$ (n=2.16). Further, in the present embodiment, the waveguide 35 has a cross-section taken by YZ-plane of a rectangular or trapezoidal shape. The width W in the track width direction (Y-axis direction) of a portion of the waveguide 35 near the end surface 350 on the head end surface 2210 side may be, for example, in the range approximately from 0.3 to 0.7 μm. Further, the thickness $T_{WG}$ (in Z-axis direction) of the waveguide 35 may be, for example, in the range approximately from 0.3 to 0.7 μm.

The buffering portion 50 is formed of a dielectric material having a refractive index $n_{BF}$ lower than the refractive index $n_{WG}$ of the waveguide 35. For example, when the wavelength $\lambda_L$ of the laser light is 600 nm and the waveguide 35 is formed of $Ta_2O_5$ (n=2.16), the buffering portion 50 can be formed of $SiO_2$ (n=1.46) or $Al_2O_3$ (n=1.63). Further, the length $L_{BF}$ (in X-axis direction) of the buffering portion 50, namely, the length of a portion sandwiched between the side surface 354 of the waveguide 35 and the propagative edge 360, is preferably in the range of 0.5 to 5 μm, and is preferably larger than the wavelength $\lambda_L$ of the laser light 53b. Further, the thickness $T_{BF}$ (in Z-axis direction) of the buffering portion 50 is preferably in the range of 10 to 200 nm.

The surface plasmon generator 36 is preferably formed of a conductive material of, for example, a metal such as Ag, Au, pd, Pt, Rh, Ir, Ru, Cu or Al, or an alloy made of at least two of these elements, especially an alloy with Ag as a main component. Further, the surface plasmon generator 36 can have a width $W_{NF}$ in the track width direction (Y-axis direction) of the upper surface 361, the width $W_{NF}$ being sufficiently smaller than the wavelength of the laser light 53b, and being in the range of, for example, approximately 10 to 100 nm. And the surface plasmon generator 36 can have a thickness $T_{NF1}$ (in Z-axis direction) sufficiently smaller than the wavelength of the laser light 53b, the thickness $T_{NF1}$ being in the range of, for example, approximately 10 to 100 nm. Further, the length (height) $H_{NF}$ (in X-axis direction) can be set to be in the range of, for example, approximately 0.8 to 6.0 μm.

The optical system that is provided in the head element part 221 and generates light for thermal assist is not limited to the above-described one. For example, as an alternative, there can be available an optical system that use a NF-light generator having another shape and structure, or an optical system in which a plasmon antenna made of a metal piece is provided at the end of a waveguide.

Figure 7A:
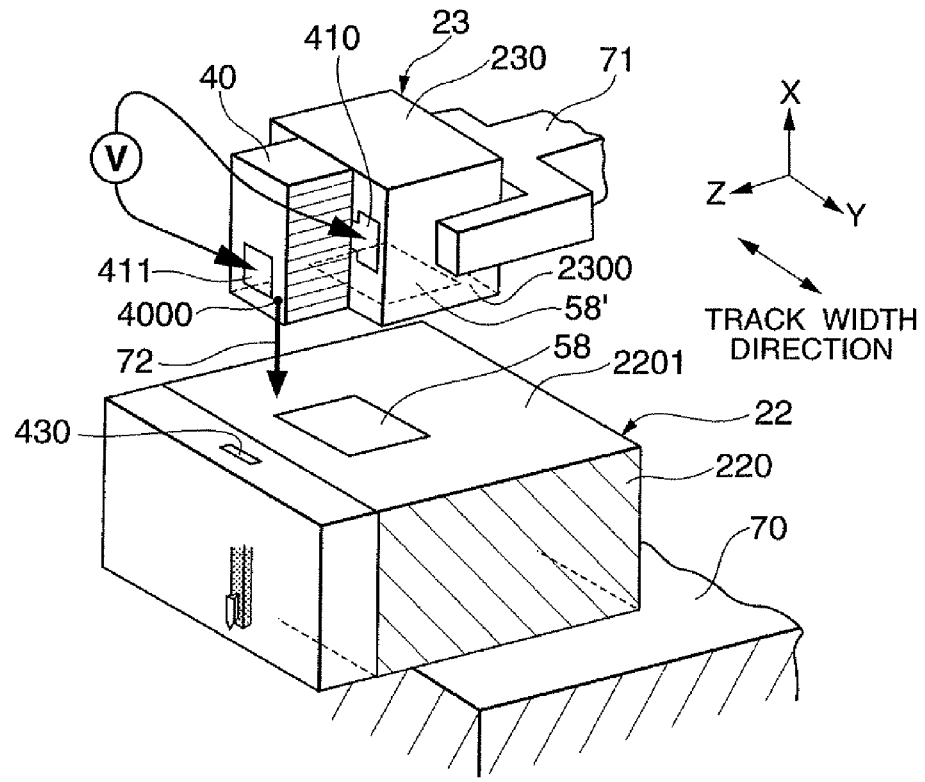
FIGS. 7a to 7c show perspective views schematically illustrating an embodiment of the method for manufacturing a thermally-assisted magnetic recording head in which a light source unit and a slider are joined with each other according to the present invention.
Figure 7B:
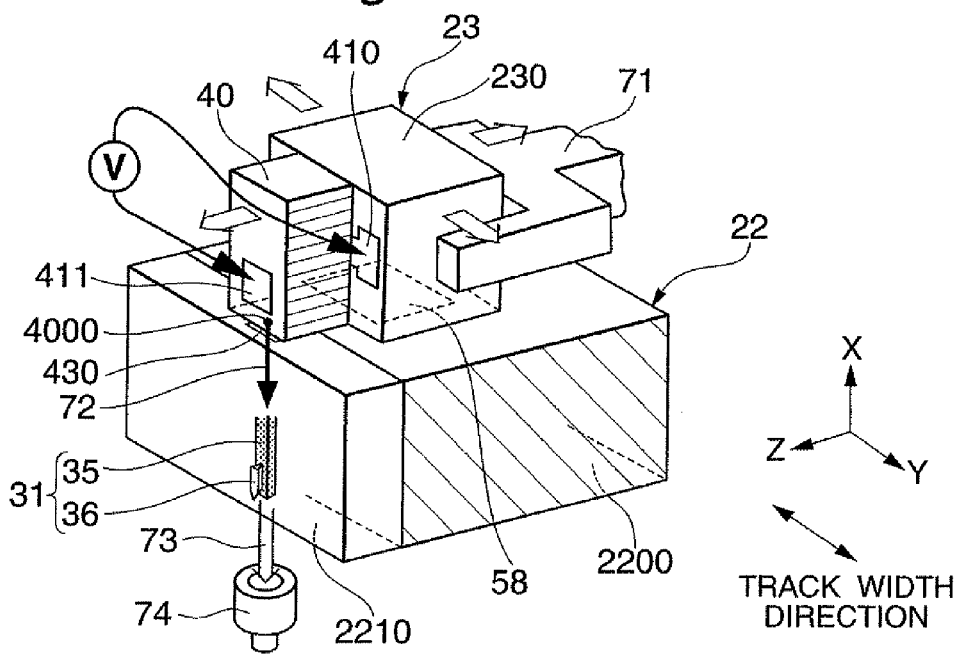
Figure 7C:
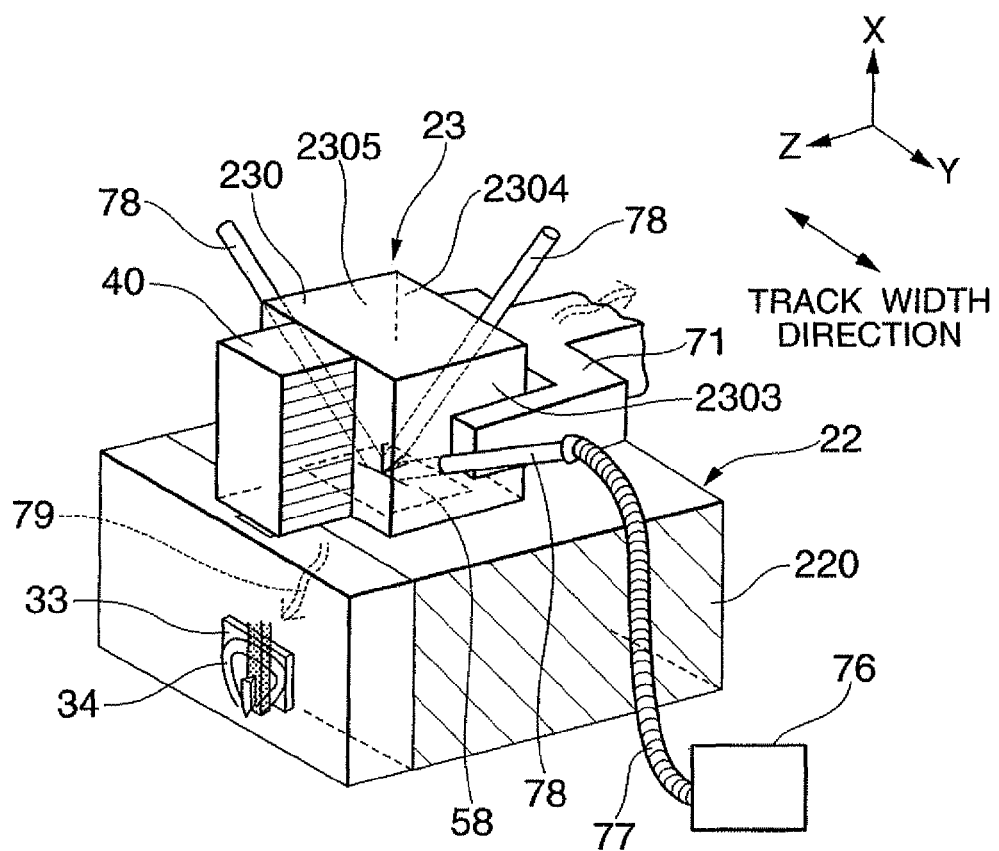

FIGS. 7a to 7c show perspective views schematically illustrating an embodiment of the method for manufacturing a thermally-assisted magnetic recording head 21 in which a light source unit 23 and a slider 22 are joined with each other according to the present invention.

As shown in FIG. 7a, first a solder layer 58 is formed on the back surface 2201 of the slider 22 by an evaporation method, for example. The solder layer 58 is a layer formed of adhesion material for bonding the light source unit 23 and the slider 22 together. As stated above, the solder layer 58 is preferably made of an alloy containing one element selected from the group consisting of Au, Ag, Cu, Ge, Al and Mg that has a melting point lower than 400° C. The alloy is more preferably Au—Si, Au—Ge (germanium), Au—Sn (tin), Ag—Sn, Cu—Sn, Ge—Zn, Al—Sn, Al—Zn, Mg—Sn, or Mg—Zn. As the layer of adhesion material, a solder layer 58' may be formed on the joining surface 2300 of the light source unit 23 as well. Alternatively, the solder layers 58 and 58' may be provided on the slider unit 22 and the light source unit 23, respectively.

Then, the slider 22 is placed on a stage 70 of an alignment system and the light source unit 23 is attached to a holding jig 71 of the alignment system in such a manner that the joining surface 2300 of the unit substrate 230 is opposed to the back surface 2201 of the slider substrate 220. The positioning of the holding jig 71 can be controlled in relation to the stage 70 with desired accuracy, for example, an accuracy of ±1 μm or higher in Y-axis and Z-axis directions. Then a predetermined voltage is applied between terminal electrodes 410 and 411 of a laser diode 40 provided on the light source unit 23 to activate the laser diode 40 and to cause the laser diode 40 to emit laser light 72 from its light-emission center 4000. Here, the light source unit 23 and the slider 22 are at a predetermined distance away from each other in X-axis direction and are movable in Y-axis direction (the track width direction) and Z-axis direction.

In the present embodiment, as illustrated in FIG. 7b, while the light source unit 23 and the slider 22 are moved in Y-axis and Z-axis directions with respect to each other, the laser diode 40 is actually kept operating, and laser light 72 being emitted from the light-emission center 4000 is monitored in real time by a photodetector 74 provided on the head end surface 2210 side to perform alignment. That is, the so-called active alignment method, which can achieve high alignment accuracy, is used to align the light source unit 23 with the slider 22. Specifically, laser light 72 emitted from the light-emission center 4000 of the light source unit 23 is incident on an optical system 31 through a light-receiving end surface 430 of the slider 22 and is detected by the photodetector 74 as light 73 emitted from the end surface 350 (FIG. 6) of a waveguide 35 or from the end surface 36a (FIG. 6) of the surface plasmon generator 36. The photodetector 74 is disposed in such a manner that its light-receiving surface faces the end surface 350 or 36a. Here, the position of the slider 22 and the light source unit 23 at the time the largest monitor output is obtained from the photodetector 74 is determined to be the alignment completion position in YZ plane, the largest monitor output indicating that the largest amount of laser light 72 is incident on the light-receiving end surface 430.

Then, as shown in FIG. 7c, the holding jig 71 is moved closer to the stage 70 in such a way as to reduce the distance between the light source unit 23 and the slider 22 in X-axis direction without changing the determined relative position of the light source unit 23 and the slider 22 in YZ plane, until the light source unit 23 contacts the slider 22, thereby determine the relative positions of the light source unit 23 and the slider 22. Here, the solder layer 58 (solder layer 58') is sandwiched between the light source unit 23 and the slider 22. Then, the solder layer 58 (solder layer 58') sandwiched is irradiated with light 78 having a predetermined wavelength that passes through the unit substrate 230 via the unit substrate 230. The irradiation with the light 78 melts and then solidifies the solder layer 58 (solder layer 58') to bond the light source unit 23 and slider 22.

The light 78 can be Nd-YAG laser light (which has a wavelength of 1064 nm) emitted from an Nd-YAG laser oscillator 76 through an optical fiber 77. Here, YAG is the name of a crystal having a garnet structure, made of a composite oxide $(Y_3Al_5O_{12})$ of Y (yttrium) and Al (aluminum). Nd-YAG laser light can be obtained by using a YAG crystal in which a several percent of Y is replaced with Nd (neodymium) as the laser medium. The Nd-YAG laser light is widely used in research, industrial, medical and other applications. If Nd-YAG laser light is used as the light 78, the unit substrate 230 is made from a material that has a transmittance higher than or equal to 50% at a wavelength of 1064 nm, such as Si (transmittance: 67%), GaAs (transmittance: 66%), or SiC (transmittance: 80%) so that the solder layer 58 (solder layer 58') can be irradiated with a sufficient amount of light 78 for melting which passes through the unit substrate 230. The light 78 may be other type of laser light such as YAG laser light other than Nd-YAG laser light, solid-state laser light other than YAG laser light, or gas laser light such as carbon dioxide gas laser light. In all cases, light that has a wavelength that can pass through the unit substrate 230 and has output power required for melting the solder layer 58 (solder layer 58') is used; or a material that can pass the wavelength of light used is used to form the unit substrate 230.

The solder layer 58 is preferably made of an alloy having a melting point lower than 400° C. as stated above. For example, if the solder layer 58 is made of an Au—Sn alloy (containing 20 weight % of Sn), the melting point of the solder layer 58 will be approximately 280° C. Experiments have shown that irradiation of the solder layer 58 with Nd-YAG laser light 78 having light output power of 0.1 kW, a spot diameter of 100 μm, and a pulse width of 4 microseconds, for example, through the light source unit 23, melts the solder layer 58 sufficiently well enough to bond the light source unit 23 and the slider 22.

Using the active alignment method to align the light source unit 23 and the slider 22 with respect to each other can reduce the output power or the irradiation time required for melting of the light 78. According to the active alignment method, the laser diode 40 is kept operating and radiating considerable heat during the alignment process until irradiation with the light 78, as stated above. The solder layer 58 (solder layer 58') has already been heated by the heat to a temperature significantly higher than room temperature even just before the irradiation with the light 78. That is, the active alignment method can assist melting the solder layer 58 (58') by the light 78. An example of experiment has shown that when an Au—Sn alloy (containing 20 weight % of Sn) is used as the solder layer 58, operation of the laser diode 40 increases the temperature of the solder layer 58 from room temperature to approximately 125° C. and, as a result, the output power of Nd-YAG laser light required for increasing the temperature of the solder layer 58 to 325° C. required for melting is reduced to approximately ⅔ of the output power required when the laser diode 40 is not activated.

The light 78 is preferably emitted to at least one of side surfaces 2303, 2304 and 2305 of the unit substrate 230 that are adjacent to the joining surface 2300, and is directed to the solder layer 58 (58'). This prevents the light 78 from hitting the slider substrate 220 to heat the slider substrate 220 before the light 78 reaches the solder layer 58 (58'). Furthermore, the slider substrate 220 is preferably made of a material that has a lower thermal conductivity than the material of the unit substrate 230. For example, if the unit substrate 230 is made of Si (thermal conductivity: 168 W/(m·K)), the slider substrate 220 is preferably made of a material such as AlTiC (Al$_2$O$_3$—TiC) (thermal conductivity: 19.0 W/(m·K)) or SiO$_2$ (thermal conductivity: 10.7 W/(m·K)). In the slider 22, there is provided a magnetic head element 32 including an MR element 33 and an electromagnetic transducer 34. If these elements are heated to temperatures higher than 200° C., for example, by heat 79 from the solder layer 58 (58'), the MR multilayer 322 of the MR element 33 (FIG. 5) tends to degrade, or the main magnetic pole 3400, the lower shield 3450 (FIG. 5) or the like of the electromagnetic transducer 34 tends to thermally expand to protrude to an undesirable extent, which can result in defects. However, if the conditions of irradiation direction and thermal conductivity described above are satisfied, excessive heating of the slider substrate 220 by irradiation with the light 78 is avoided, and the amount of heat conducted to the slider substrate 220 out of the amount of heat generated from the solder layer 58 (58') and the unit substrate 230 can be reduced. Consequently, adverse influence of heat on the MR element 33 and the electromagnetic transducer 34 can be suppressed.

It is also preferable that heat generated from the solder layer 58 (58') and the unit substrate 230 by irradiation of the light 78 is dissipated to the outside world through the holding jig 71 holding the light source unit 23. The laser diode 40 provided in the light source unit 23 usually does not degrade on exposure to a high temperature on the order of 400° C., for example. However, in order to avoid excessive heating of the laser diode 40 and the magnetic head element 32 described above, the holding jig 71 is preferably made of a material such as a metal that has a high thermal conductivity so that the holding jig 71 functions as a heatsink during irradiation with light 78. It should be noted that the heat dissipation by the holding jig 71 is adjusted so that the solder layer 58 (58') sufficiently melts by the irradiation with light 78 and the assistance of heat from the laser diode 40.

Figure 8A:
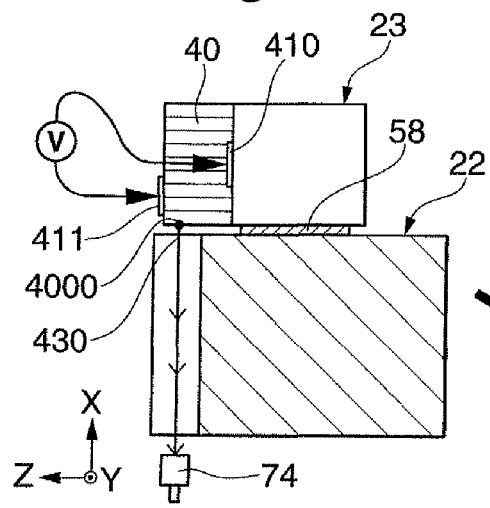
FIGS. 8a to 8c show perspective views schematically illustrating another embodiment of the method for manufacturing the thermally-assisted magnetic recording head, in which a light source unit and a slider are joined with each other, according to the present invention.
Figure 8B:
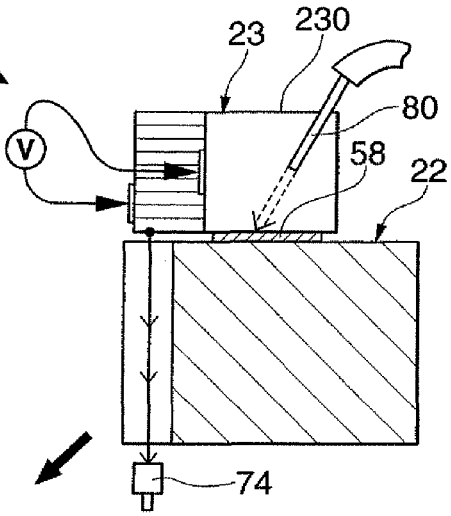
Figure 8C:
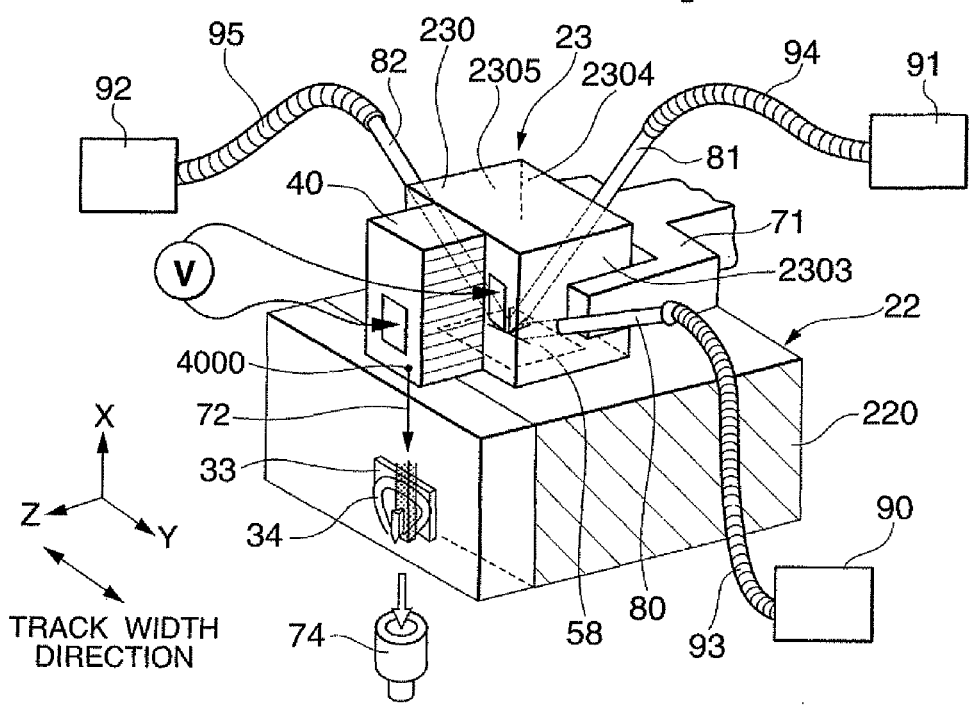

FIGS. 8*a* to 8*c* show perspective views schematically illustrating another embodiment of the method for manufacturing the thermally-assisted magnetic recording head 21, in which a light source unit 23 and a slider 22 are joined with each other, according to the present invention.

Referring to FIG. 8*a*, first the active alignment method is used to align the light source unit 23 and the slider 22 with each other as described with reference to FIGS. 7*a* and 7*b*, to determine the positions of the light source unit 23 and the slider 22 with a solder layer 58 sandwiched between them. Then, as shown in FIG. 8*b*, the solder layer 58 is irradiated with light 80 such as Nd-YAG laser light through the unit substrate 230 to melt and solidify the solder layer 58 to bond the light source unit 23 and the slider 22 together as described with reference to FIG. 7*c*.

Here, depending on the conditions of irradiation with the light 80 and the position and state of the solder layer 58, the solder layer 58 can be partially melted by the light 80, the rates of melting can vary from location to location, or the rates of solidification after the melting can differ from location to location. Such variations can generate a force that moves the light source unit 23 and the slider 22. Further, depending on the degree of the force, the light source unit 23 and the slider 22 which have been aligned can be displaced with respect to each other after irradiation with light 80.

In order to prevent such displacement, multiple Nd-YAG laser oscillators 90, 91 and 92 are provided beforehand as illustrated in FIG. 8*c*, and the radiation apertures of optical fibers 93, 94 and 95 are arranged in such a way that the solder layer 58 can be irradiated with beams of light 80, 81 and 82 from different directions. Then, the amount of displacement of the light source unit 23 and the slider 22 with respect to each other is obtained beforehand in the case that the solder layer 58 is irradiated with a predetermined one shot (pulse) of each of the beams of light 80, 81 and 82. Then, the laser diode 40 is actually activated and laser light 72 emitted from the light-emission center 4000 is monitored in real time by a photodetector 74 provided on the head end surface 2210 side while the Nd-YAG laser oscillators 91, 91 and 92 are activated as appropriate to irradiate the solder layer 58 with an appropriate number of shots of each light beams 80, 81 and 82. In the irradiation, the appropriate number of shots of each light beams 80, 81 and 82 is made by taking into consideration the amount of displacement caused by the predetermined one shot of each light beam 80, 81 and 82, so that the maximum monitor output is provided from the photodetector 74, thereby correcting the positions.

According to the method described above, alignment using the active alignment method can be accomplished with high accuracy while irradiating the solder layer 58 with light beams 80, 81 and 82 from different directions to repeatedly melt the solder layer 58. Consequently, variations in relative positions of the light source unit 23 and the slider 22 caused by melting of the solder layer 58 can be corrected to ensure reliable bonding of the light source unit 23 and the slider 22 in a desired position.

The method does not necessarily need multiple Nd-YAG laser oscillators. For example, an optical switch may be provided so that a single Nd-YAG laser oscillator 90 can provide laser light into any of the optical fibers 93, 94 and 95. Alternatively, a set of Nd-YAG laser oscillator 90 and optical fiber 93 may be moved as appropriate to provide light beams 80, 81 and 82 from different directions. Furthermore, the number of light beams from different directions for melting the solder layer 58 is not limited to three; two or more than three light beams may be used.

In any of the manufacturing methods according to the present invention described with reference to FIGS. 7a to 7c and FIGS. 8a to 8c, since the adhesion material layer(s) (solder layer(s) 58, 58') can be melted by light such as YAG laser light in bonding of the light source unit 23 and the slider 22, high alignment accuracy can be achieved while joining with higher bonding strength and less change with time can be achieved. Furthermore, since the adhesion material layer(s) (solder layer(s) 58, 58') is irradiated with light such as YAG laser light through the unit substrate 230 to melt the layer(s), adverse influence of heat generated by irradiation on the magnetic head element 32 in the slider 22 can be avoided.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A method for manufacturing a thermally-assisted magnetic recording head in which a light source unit including a light source provided in a unit substrate and a slider including an optical system provided in a slider substrate are joined with each other, wherein the unit substrate is made of a material transmitting light having a predetermined wavelength and an adhesion material layer is formed on a surface of one or each of the light source unit and the slider, the manufacturing method comprising the steps of:
   aligning the light source unit and the slider with each other in such a way that a light generated from the light source can enter the optical system and the adhesion material layer is sandwiched between the light source unit and the slider;
   irradiating the adhesion material layer with a light including the predetermined wavelength through the unit substrate to melt the adhesion material layer; and
   bonding the light source unit and the slider with each other.

2. The manufacturing method as claimed in claim 1, wherein the light source is activated, and the light source unit and the slider are aligned in such a way that the light generated from the light source enters the optical system.

3. The manufacturing method as claimed in claim 2, wherein the melting of the adhesion material layer by the irradiation of the light including the predetermined wavelength is assisted by heating the adhesion material layer to a high temperature with a heat generated from the activated light source.

4. The manufacturing method as claimed in claim 2, wherein the adhesion material layer is repeatedly melted by irradiating the adhesion material layer with the lights including the predetermined wavelength from different directions through the unit substrate, to correct variations in relative positions of the light source unit and the slider caused by the melting of the adhesion material layer.

5. The manufacturing method as claimed in claim 4, wherein the amount of displacement of the light source unit and the slider with respect to each other is obtained beforehand in the case that the adhesion material layer is irradiated with a predetermined one shot of each of the lights from different directions, then the number of shots of each of the lights from different directions is determined.

6. The manufacturing method as claimed in claim 1, wherein the slider comprises a magnetic head element configured to write and/or read data, and the slider substrate is made of a material having a lower thermal conductivity than a material of the unit substrate so that conduction of a heat generated by the irradiation of the light including the predetermined wavelength to the slider substrate is limited.

7. The manufacturing method as claimed in claim 6, wherein, during the alignment, a holding means to hold the light source unit is used as a heatsink for the heat generated by the irradiation of the light including the predetermined wavelength.

8. The manufacturing method as claimed in claim 1, wherein the unit substrate is made of a material selected from a group consisting of silicon, gallium arsenide and silicon carbide, and a YAG laser light is used as the light including the predetermined wavelength.

9. The manufacturing method as claimed in claim 1, wherein the adhesion material layer is made of an alloy containing one element selected from a group consisting of gold, silver, copper, germanium, aluminum and magnesium.

10. A thermally-assisted magnetic recording head comprising:
   a light source unit comprising: a unit substrate made of a material transmitting light having a predetermined wavelength; and a light source provided in a source-installation surface of the unit substrate; and
   a slider comprising: a slider substrate made of a material having a lower thermal conductivity than a material of the unit substrate; a magnetic head element configured to write and/or read data and provided in an element-integration surface of the slider substrate; and an optical system configured to propagate a light from the light source to a magnetic recording medium and provided in the element-integration surface,
   the light source unit and the slider being bonded by an adhesion material layer melted and solidified with a light that includes the predetermined wavelength and has passed through the unit substrate.

* * * * *